United States Patent
Singh

(10) Patent No.: US 10,309,489 B2
(45) Date of Patent: Jun. 4, 2019

(54) MULTI-SPEED DUAL CLUTCH TRANSMISSION

(71) Applicant: GM Global Technology Operations LLC, Detroit, MI (US)

(72) Inventor: Tejinder Singh, Commerce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 796 days.

(21) Appl. No.: 14/940,962

(22) Filed: Nov. 13, 2015

(65) Prior Publication Data

US 2017/0138441 A1    May 18, 2017

(51) Int. Cl.
  *F16H 3/093* (2006.01)
  *F16H 3/00* (2006.01)
  *F16H 3/08* (2006.01)

(52) U.S. Cl.
  CPC .............. *F16H 3/093* (2013.01); *F16H 3/006* (2013.01); *F16H 2003/0826* (2013.01); *F16H 2003/0931* (2013.01); *F16H 2200/006* (2013.01)

(58) Field of Classification Search
  CPC .. F16H 3/006; F16H 3/093; F16H 2003/0826; F16H 2003/0931; F16H 2200/006
  USPC .................................... 74/330, 331
  See application file for complete search history.

(56) References Cited

U.S. PATENT DOCUMENTS

| | | | | |
|---|---|---|---|---|
| 7,392,721 B2 * | 7/2008 | Pollak | ......... | F16D 48/062 74/330 |
| 8,266,977 B2 * | 9/2012 | Mohlin | ......... | F16H 3/006 74/330 |
| 8,408,085 B2 * | 4/2013 | Sowul | ......... | F16H 3/006 74/330 |
| 8,443,686 B2 * | 5/2013 | Singh | ......... | F16H 3/006 74/330 |
| 8,505,401 B2 * | 8/2013 | Singh | ......... | F16H 3/006 74/331 |
| 8,622,862 B2 * | 1/2014 | Koyama | ......... | B60K 6/36 74/330 |

FOREIGN PATENT DOCUMENTS

DE    102012213330 A1    2/2013

* cited by examiner

*Primary Examiner* — William C Joyce

(57) ABSTRACT

A transmission is connectable to an input member and includes an output transfer gear, first and second transmission input shaft members, first, second and third countershaft members, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

17 Claims, 3 Drawing Sheets

|  | 36 | 38 | 150 | 152 | 154 | 156 | 158 |
|---|---|---|---|---|---|---|---|
| REV |  | X |  |  |  |  | X |
| 1ST | X |  | X |  |  |  |  |
| 2ND |  | X |  |  |  | X |  |
| 3RD | X |  |  | X |  |  |  |
| 4TH |  | X |  |  | X |  |  |
| 5TH | X |  |  | X |  |  |  |
| 6TH |  | X |  |  |  | X |  |
| 7TH | X |  | X |  |  |  |  |
| 8TH |  | X |  |  | X |  |  |

MULTI-SPEED DUAL CLUTCH TRANSMISSION

TECHNICAL FIELD

The present disclosure relates to transmissions and more particularly to a compact, dual clutch multiple speed transmission having countershafts to establish eight or more gear speeds.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission connectable to an input member and includes an output member, first and second transmission input shaft members, first, second and third countershaft members, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

In another embodiment of the present invention, a transmission is provided having a transmission housing, a dual clutch assembly, a first, second, third, and fourth gear sets, a first and second transmission input member, a first, second and third countershafts and five synchronizer assemblies. The selective engagement of the first and second clutches of the dual clutch assembly interconnects the dual clutch housing with at least one of the first and the second transmission input members and the selective engagement of at least one of the five synchronizer assemblies establishes at least one of a plurality of forward and reverse speed ratios.

In still another embodiment of the present invention, the dual clutch assembly has a first clutch, a second clutch and a clutch housing connectable to an engine output member. The clutch housing is rotationally supported within the transmission housing.

In still another embodiment of the present invention, the first gear set includes a first gear, a second gear, a third gear and an idler gear. The first gear is in mesh with the second gear and the second gear is in mesh with the idler gear and the idler gear is in mesh with the third gear, the second gear set includes a first gear in mesh with a second gear and a third gear, the third gear set includes a first gear in mesh with a second gear and a third gear, the fourth gear set includes a first gear, a second gear, a third gear, a fourth gear and an idler gear. The first gear is in mesh with the third gear, the third gear is in mesh with fourth gear and the idler gear and the second gear is in mesh with the idler gear.

In still another embodiment of the present invention, a first transmission input member is rotatably supported in the transmission housing. The first gear of the first gear set and the first gear of the second gear set are rotatably fixed for common rotation with the first transmission input member. The selective engagement of the first clutch of the dual clutch assembly transfers torque from the clutch housing to the first transmission input member.

In still another embodiment of the present invention, the second transmission input member is rotatably supported in the transmission housing. The first gear of the third gear set and the first gear of the fourth gear set are rotatably fixed for common rotation with the second transmission input member. The second transmission input member is concentric with the first transmission input member and at least partially overlays the first transmission input member. The selective engagement of the second clutch of the dual clutch assembly transfers torque from the clutch housing to the second transmission input member.

In still another embodiment of the present invention, a first countershaft is rotatably supported within the transmission housing and spaced apart from and parallel with the first and second transmission input members. The second gear of the first gear set, the second gear of the second gear set, the second gear of the third gear set, the second gear of the fourth gear set are selectively connectable for common rotation with the first countershaft.

In still another embodiment of the present invention, the second countershaft is rotatably supported within the transmission housing and spaced apart from and parallel with the first and second transmission input members. The third gear of the first gear set, the third gear of the second gear set, the third gear of the third gear set, the third gear of the fourth gear set are each selectively connectable for common rotation with the second countershaft.

In still another embodiment of the present invention, the third countershaft is rotatably supported within the transmission housing and spaced apart from and parallel with the first and second transmission input members. The fourth gear of the fourth gear set is selectively connectable for common rotation with the third countershaft.

In still another embodiment of the present invention, the first countershaft transfer gear is rotatable fixed to the first countershaft for common rotation with the first countershaft.

In still another embodiment of the present invention, the second countershaft transfer gear is rotatable fixed to the second countershaft for common rotation with the second countershaft.

In still another embodiment of the present invention, the third countershaft transfer gear is rotatable fixed to the third countershaft for common rotation with the third countershaft and the first, second and third countershaft transfer gears transfer torque to a transmission output member.

In yet another embodiment of the present invention, the five synchronizer assemblies selectively couple at least one of gears of the four gear sets with at least one of the first, second and third countershafts.

In yet another embodiment of the present invention, the selective engagement of the first and second clutches of the dual clutch assembly interconnects the dual clutch housing with at least one of the first and the second transmission input members and the selective engagement of at least one of the four synchronizer assemblies establishes at least one of a plurality of forward and reverse speed ratios.

In yet another embodiment of the present invention, a first of the five synchronizer assemblies selectively connects the second gear of the first gear set and the second gear of the second gear set to the first countershaft.

In yet another embodiment of the present invention, a second of the five synchronizer assemblies selectively connects the third gear of the first gear set and the third gear of the second gear set to the second countershaft.

In yet another embodiment of the present invention, a third of the five synchronizer assemblies selectively connects the second gear of the third gear set and the second gear of the fourth gear set to the first countershaft.

In yet another embodiment of the present invention, a fourth of the five synchronizer assemblies selectively connects the third gear of the third gear set and the third gear of the fourth gear set to the second countershaft.

In yet another embodiment of the present invention, a fifth of the five synchronizer assemblies selectively connects the fourth gear of the fourth gear set to the third countershaft.

In yet another embodiment of the present invention, the second gear set further comprises a fourth gear and an idler gear, wherein the fourth gear is in mesh with the idler gear and the idler gear is in mesh with the third gear of the fourth gear set.

In yet another embodiment of the present invention, a fifth of the five synchronizer assemblies selectively connects the fourth gear of the second gear set and the fourth gear of the fourth gear set to the third countershaft.

In yet another embodiment of the present invention, the third gear set further comprises a fourth gear and an idler gear, wherein the fourth gear is in mesh with the idler gear and the idler gear is in mesh with the third gear of the fourth gear set.

In yet another embodiment of the present invention, a sixth synchronizer assembly selectively connects the fourth gear of the second gear set to the third countershaft.

In yet another embodiment of the present invention, the transmission output member is a gear that meshes with the each of the first, second and third countershaft transfer gears.

In yet another embodiment of the present invention, the fourth gear set is adjacent the dual clutch assembly, the third gear set is adjacent the fourth gear set, the second gear set is adjacent the third gear set and the first gear set is disposed between the second gear set and an end wall of the transmission housing.

In yet another embodiment of the present invention, the transmission includes a first, second, third and fourth gear set, wherein the first gear set includes a first gear, a second gear, a third gear and an idler gear. The first gear is in mesh with the second gear and the second gear is in mesh with the idler gear and the idler gear is in mesh with the third gear. The second gear set includes a first gear in mesh with a second gear and a third gear. The third gear set includes a first gear in mesh with a second gear and a third gear, the fourth gear set includes a first gear, a second gear and a third gear. The first gear is in mesh with the second gear and the second gear is in mesh with third gear.

In yet another embodiment of the present invention, a third of the five synchronizer assemblies selectively connects the second gear of the third gear set to the first countershaft.

In yet another embodiment of the present invention, a fifth of the five synchronizer assemblies selectively connects the fourth gear of the third gear set and the third gear of the fourth gear set to the third countershaft.

In yet another embodiment of the present invention, the transmission includes a first, second, third and fourth gear set. The first gear set includes a first gear and a second gear. The first gear is in mesh with the second gear, the second gear set includes a first gear in mesh with a second gear and a third gear, the third gear set includes a first gear in mesh with a second gear and a third gear. The fourth gear set includes a first gear, a second gear, a third gear a fourth gear and an idler gear. The first gear is in mesh with the third gear, the third gear is in mesh with the fourth gear and the idler gear and the second gear is in mesh with the idler gear.

In yet another embodiment of the present invention, a fifth gear set where the fifth gear set includes a first gear fixed to second transmission input member, a second gear in mesh with the first gear and a third gear in mesh with the first gear.

In yet another embodiment of the present invention, the second gear of the fourth gear set is selectively connectable to the second countershaft.

In yet another embodiment of the present invention, the third gear of the fourth gear set is selectively connectable to the third countershaft In yet another embodiment of the present invention, the transmission output member is a gear that meshes with the each of the first and second countershaft transfer gears.

In yet another embodiment of the present invention, the fourth gear set is adjacent the dual clutch assembly, the third gear set is adjacent the fourth gear set, the second gear set is adjacent the third gear set and the first gear set is disposed between the second gear set and an end wall of the transmission housing.

The above features and advantages and other features and advantages of the present invention are readily apparent from the following detailed description of the best modes for carrying out the invention when taken in connection with the accompanying drawings wherein like reference numbers refer to the same component, element or feature.

DESCRIPTION

Figures 1, 2:
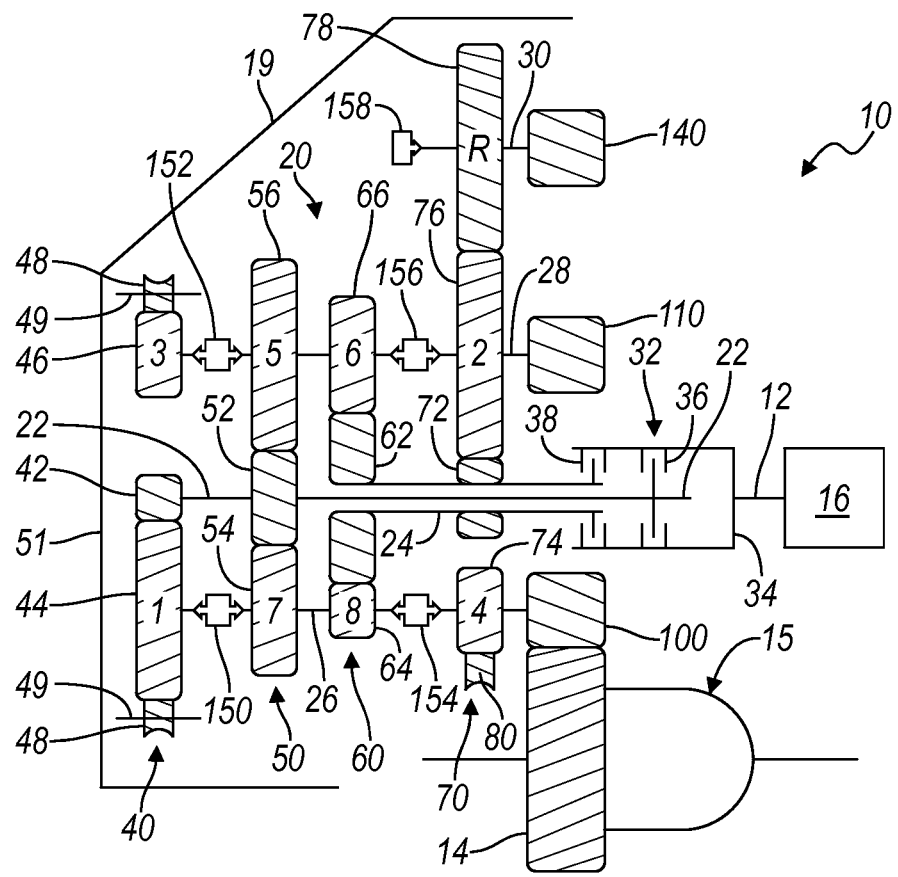
FIG. 1 is a schematic view of an embodiment of an eight speed transmission having a dual clutch, two transmission input shafts, three countershafts, a plurality of gear sets and a plurality of synchronizers, in accordance with the present invention.
FIG. 2 is a clutch table illustrating the state of engagement of the dual clutch and each of the plurality of synchronizers for each of the eight forward gear ratios and one reverse gear ratio, in accordance with the present invention.

Referring to FIG. 1, a multiple speed transmission is generally indicated by reference number 10. The transmission 10 is connectable to an input member 12 and has an output member or gear 14. In the present embodiment, the input member 12 is a shaft and the output member 14 is a gear, however those skilled in the art will appreciate that the input member 12 may be components other than shafts and the output member 14 may be a component, such as a shaft, other than a gear.

The input member 12 is continuously connected with an engine 16 or other torque producing machine to provide a driving torque to input member 12. The output member or gear 14 rotatably drives a differential assembly 15. The differential assembly transfers torque delivered by output member 14, ultimately, to road wheels (not shown).

The transmission 10 includes a housing 19 that at least partially encloses a gearing arrangement 20. The gearing arrangement 20 includes various shafts or members, co-planar intermeshing gear sets, a dual clutch assembly, and selectively engageable synchronizers, as will be described herein. For example, the gearing arrangement 20 includes a first transmission input shaft or member 22, a second transmission input shaft or member 24, a first countershaft 26, a second countershaft 28 and a third countershaft 30. The second transmission input shaft or member 24 is a hollow shaft that is concentric with and at least partially overlies the first transmission input shaft or member 22. The first countershaft 26, the second countershaft 28 and the third countershaft 30 are each spaced apart from and parallel with the first and second transmission input shaft members 22, 24. The first and second transmission input shafts 22, 24 define a first axis of rotation, the first countershaft 26 defines a second axis of rotation, the second countershaft 28 defines a third axis of rotation and the third countershaft 30 defines a fourth axis of rotation. The position and location of countershafts 26, 28 and 30 relative to first and second transmission input shafts 22, 24 are interchangeable.

A dual clutch assembly 32 is connectable between the input member 12 and the first and second transmission input shaft members 22, 24. The dual clutch assembly 32 includes a clutch housing 34 connectable for common rotation with the input member 12. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon or otherwise coupled thereto that interact to form a friction clutch. The clutch element 36 is selectively connectable for common rotation with the first transmission input shaft or member 22 and the clutch element 38 is selectively connectable for common rotation with the second transmission input shaft or member 24. Thus, selective engagement of clutch element 36 with the clutch housing 34 connects the input member 12 for common rotation with the first transmission input shaft member 22. Selective engagement of clutch element 38 with the clutch housing 34 connects the input member 12 for common rotation with the second transmission input shaft member 24. It should be appreciated that the dual clutch assembly 32 shown throughout the Figures may be a wet or dry clutch assembly without departing from the scope of the present invention.

The gearing arrangement 20 also includes a plurality of co-planar, meshing gear sets 40, 50, 60 and 70. The present invention contemplates that the plurality of co-planar, meshing gear sets 40, 50, 60 and 70 may be arranged axially along transmission input shafts 22, 24 in an order other than that which is shown in FIG. 1 and still be within the scope of the invention. Co-planar gear set 40 includes a first pinion gear 42, a second pinion gear 44 and a third pinion gear 46 and an idler gear 48. First pinion gear 42 is rotatably fixed and connected for common rotation with the transmission input shaft 22. Second pinion gear 44 is freely rotatable about the first countershaft 26 and meshes with first pinion gear 42 and with idler gear 48. Third pinion gear 46 is freely rotatable about the second countershaft 28 and meshes with idler gear 48. It should be appreciated that first pinion gear 42 may be a separate gear structure fixed to the transmission input shaft 22 or gear teeth/splines formed on an outer surface of the transmission input shaft 22 without departing from the scope of the present invention. Likewise, it should also be appreciated that second pinion gear 44 may be a separate gear structure fixed to the first countershaft 26 or gear teeth/splines formed on an outer surface of the first countershaft 26 without departing from the scope of the present invention. Similarly, it should be appreciated that third pinion gear 46 may be a separate gear structure fixed to the second countershaft 28 or gear teeth/splines formed on an outer surface of the second countershaft 28 without departing from the scope of the present invention. Gear set 40 is disposed adjacent a wall 51 of the transmission housing 19 on the opposite side of the transmission relative to the dual clutch assembly 32.

Co-planar gear set 50 includes a first pinion gear 52, a second pinion gear 54 and a third pinion gear 56. First pinion gear 52 is rotatably fixed and connected for common rotation with the first transmission input shaft member 22 and meshes with the second pinion gear 54 and the third pinion gear 56. Second pinion gear 54 is freely rotatable about the first countershaft 26. Third pinion gear 56 is freely rotatable about the second countershaft 28. Gear set 50 is positioned axially adjacent gear set 40.

Co-planar gear set 60 includes a first pinion gear 62, a second pinion gear 64 and a third pinion gear 66. First pinion gear 62 is rotatably fixed and connected for common rotation with the second transmission input shaft member 24 and meshes with the second pinion gear 64 and the third pinion gear 66. Second pinion gear 64 is freely rotatable about the first countershaft 26. Third pinion gear 66 is freely rotatable about the second countershaft 28. Gear set 60 is disposed adjacent gear set 50.

Co-planar gear set 70 includes a first pinion gear 72, a second pinion gear 74, a third pinion gear 76 and a fourth pinion gear 78 and an idler gear 80. First pinion gear 72 is rotatably fixed and connected for common rotation with the second transmission input shaft member 24 and meshes with the third pinion gear 76. The second pinion gear 74 is freely rotatable about the first countershaft 26 and is in mesh with the idler gear 80. The third pinion gear 76 is freely rotatable about the second countershaft 28 and is in mesh with the first pinion gear 72, the fourth pinion gear 78 and the idler gear 80. The fourth pinion gear 78 is freely rotatable about the third countershaft 30 and is in mesh with the third pinion gear 76. Gear set 70 is positioned adjacent gear set 60.

Further, a first countershaft transfer gear 100 is fixedly connected for common rotation with the first countershaft member 26. A second countershaft transfer gear 110 is fixedly connected for common rotation with the second countershaft member 28. A third countershaft transfer gear 140 is fixedly connected for common rotation with the third countershaft member 30. First countershaft transfer gear 100 is configured to mesh with output member 14, the second countershaft transfer gear 110 is configured to mesh with output member 14 and the third countershaft transfer gear 140 is configured to mesh with output member 14. However, the first countershaft transfer gear 100, the second countershaft transfer gear 110 and the third countershaft transfer gear 140 do not mesh with each other.

A park gear (not shown) may be provided for placing transmission 10 in a park mode that prevents output member 14 from rotating. The park gear may be rotationally fixed to the first, second or third countershaft members 26, 28 and 30. However, the axial location of the park gear along the first, second or third countershaft members 26, 28 or 30 may be altered in accordance with available packaging space.

With continued reference to FIG. 1, the transmission 10 further includes a plurality of selectively engageable synchronizer assemblies 150, 152, 154, 156 and 158. Synchronizers 150, 152, 154 and 156 and are double sided synchronizers and generally include a shift fork (not shown) that is bi-directionally translated by an actuator (not shown) into at least two engaged positions and a neutral or disengaged position. In the present embodiment, synchronizer 150 is selectively actuatable to selectively connect the second pinion gear 44 and the second pinion gear 54 for common rotation with the first countershaft member 26. Synchronizer 152 is selectively actuatable to selectively connect for common rotation the third pinion gear 46 and the third pinion gear 56 with the second countershaft member 28. Synchronizer 154 is selectively actuatable to selectively connect for common rotation the second pinion gear 64 and the second pinion gear 74 with the first countershaft member 26. Synchronizer 156 is selectively actuatable to selectively connect for common rotation the third pinion gear 66 and the third pinion gear 76 with the second countershaft member 28. Synchronizer 158 is a single sided synchronizer and generally includes a shift fork (not shown) that is bi-directionally translated by an actuator (not shown) into at least one engaged position and a neutral or disengaged position. In the present embodiment, synchronizer 158 is selectively actuatable to selectively connect the fourth pinion gear 78 for common rotation with the third countershaft member 30.

The transmission 10 is capable of transmitting torque from the input shaft 12 to the output gear member 14 in at least eight forward torque ratios and at least one reverse torque ratio. Each of the forward torque ratios and the reverse torque ratio is attained by selective engagement of the dual clutch assembly 32 and one or more of the synchronizer assemblies 150, 152, 154, 156 and 158. Those skilled in the art will readily understand that a different speed ratio is associated with each torque ratio.

It should also be appreciated that each individual gear set or combinations of gear sets 40, 50, 60 and 70 provides one or more forward and/or reverse gear ratios upon selective engagement of the synchronizer assemblies 150, 152, 154, 156 and 158. Moreover, it should be appreciated that a particular forward or reverse speed ratio may be achieved by different combinations of synchronizer and associated gear sets without departing from the scope of the present invention.

Referring now to FIG. 2, a truth table or clutching chart illustrates the state of engagement for the dual clutch 32 and the synchronizers 150, 152, 154, 156 and 158. An "X" in the box means that the particular clutch and/or synchronizer are engaged to achieve the desired gear state. Actual numerical gear ratios of the various gear states may be adjusted over significant ranges to accommodate various applications and operational criteria of the transmission 10. Of course, other gear ratios are achievable depending on the gear diameter, gear teeth count and gear configuration selected.

For example, to establish the reverse torque ratio, clutch element 38 is engaged and synchronizer 158 is activated. Clutch element 38 couples the input member 12 with the second transmission input shaft member 24. Synchronizer 158 connects the fourth pinion 78 of gear set 70 with the third countershaft member 30. More specifically, input torque from the input shaft 12 is transferred through the dual clutch assembly 32 to the second transmission input shaft member 24, from transmission input shaft member 24 to gear 72, from gear 72 to gear 76, from gear 76 to gear 78, from gear 78 to synchronizer 158, from synchronizer 158 to third countershaft member 30, from third countershaft member 30 to third countershaft transfer gear 140 and from third countershaft transfer gear 140 to the output member 14.

To establish a first forward torque ratio (i.e. a 1st gear), clutch element 36 is engaged and synchronizer 150 activated. Clutch element 36 couples the input member 12 with the first transmission input shaft member 22. Synchronizer 150 connects the second pinion 44 of the first gear set 40 to the first countershaft member 26. More specifically, input torque from the input shaft 12 is transferred through the dual clutch assembly 32 to the first transmission input shaft member 22, from transmission input shaft member 22 to gear 42, from gear 42 to gear 44, from gear 44 to synchronizer 150, from synchronizer 150 to first countershaft member 26, from first countershaft member 26 to first countershaft transfer gear 100 and from first countershaft transfer gear 100 to the output member 14.

To establish a second forward torque ratio (i.e. a 2nd gear), clutch element 38 is engaged and synchronizer 156 is activated. Clutch element 38 couples the input member 12 with the second transmission input shaft member 24. Synchronizer 156 connects the third gear 76 of gear set 70 to second countershaft member 28. More specifically, input torque from the input shaft 12 is transferred through the dual clutch assembly 32 to the second transmission input shaft member 24 to gear 72, from gear 72 to gear 76, from gear 76 to synchronizer 156, from synchronizer 156 to second countershaft member 28, from second countershaft member 28 to second countershaft transfer gear 110 and from second countershaft transfer gear 110 to the output member 14.

To establish a third forward torque ratio (i.e. a 3rd gear), clutch element 36 is engaged and synchronizer 152 is activated. Clutch element 36 couples the input member 12 to the first transmission input shaft member 22 which rotates pinion 42. Synchronizer 152 connects the third gear 46 of gear set 40 the second countershaft member 28. More specifically, input torque from the input shaft 12 is transferred through the dual clutch assembly 32 to the first transmission input shaft member 22 to gear 42, from gear 42 to gear 44, from gear 44 to idler gear 48, from idler gear 48 to gear 46, from gear 46 to synchronizer 152, from synchronizer 152 to second countershaft member 28, from second countershaft member 28 to second countershaft transfer gear 110 and from second countershaft transfer gear 110 to the output member 14.

To establish a fourth forward torque ratio (i.e. a 4th gear), clutch element 38 is engaged and synchronizers 154 are activated. Clutch element 38 couples the input member 12 with the second transmission input shaft member 24. Synchronizer 154 connects the second gear 74 of gear set 70 first countershaft member 26. More specifically, input torque from the input shaft 12 is transferred through the dual clutch assembly 32 to the second transmission input shaft member 24 to gear 72, from gear 72 to gear 76, from gear 76 to idler gear 80, from idler gear 80 to gear 74, from gear 74 to synchronizer 154, from synchronizer 154 to first countershaft member 26, from first countershaft member 26 to first countershaft transfer gear 100 and from first countershaft transfer gear 100 to the output member 14.

To establish a fifth forward torque ratio (i.e. a 5th gear), clutch element 36 is engaged and synchronizer 152 is activated. Clutch element 36 couples the input member 12 with the first transmission input shaft member 22. Synchronizer 152 connects the third pinion 56 of the second gear set 50 to the second countershaft member 28. More specifically, input torque from the input shaft 12 is transferred through the dual clutch assembly 32 to the first transmission input shaft member 22 and to gear 52, from gear 52 to gear 56, from gear 56 to synchronizer 152, from synchronizer 152 to the second countershaft member 28, from second countershaft member 28 to the second countershaft transfer gear 110 and from second countershaft transfer gear 110 to the output member 14.

To establish a sixth forward torque ratio (i.e. a 6th gear), clutch element 38 is engaged and synchronizer 156 is activated. Clutch element 38 couples the input member 12 with the second transmission input shaft member 24. Synchronizer 156 connects third pinion gear 66 of the third gear set 60 the second countershaft member 28. More specifically, input torque from the input shaft 12 is transferred through the dual clutch assembly 32 to the second transmission input shaft member 24 and to gear 62, from gear 62 to gear 66, from gear 66 to synchronizer 156, from synchronizer 156 to second countershaft member 28, from second countershaft member 28 to second countershaft transfer gear 110, from second countershaft transfer gear 110 to the output member 14.

To establish a seventh forward torque ratio (i.e. a 7th gear), clutch element 36 is engaged and synchronizer 150 is activated. Clutch element 36 couples the input member 12 with the first transmission input shaft member 22. Synchronizer 150 connects second pinion gear 54 of the second gear set 50 the first countershaft member 26. More specifically, input torque from the input shaft 12 is transferred through the dual clutch assembly 32 to the first transmission input shaft member 22 and to gear 52, from gear 52 to gear 54, from gear 54 to synchronizer 150, from synchronizer 150 to first countershaft member 26, from first countershaft member 26 to first countershaft transfer gear 100, from first countershaft transfer gear 100 to the output member 14.

To establish an eighth forward torque ratio (i.e. an 8th gear), clutch element 38 is engaged and synchronizer 154 is activated. Clutch element 38 couples the input member 12 with the second transmission input shaft member 24. Synchronizer 154 connects second pinion gear 64 of the third gear set 60 the first countershaft member 26. More specifically, input torque from the input shaft 12 is transferred through the dual clutch assembly 32 to the second transmission input shaft member 24 and to gear 62, from gear 62 to gear 64, from gear 64 to synchronizer 154, from synchronizer 154 to first countershaft member 26, from first countershaft member 26 to first countershaft transfer gear 100, from first countershaft transfer gear 100 to the output member 14.

Again, it should be appreciated that any one of the gear sets of gear sets 40, 50, 60 and 70 may be changed in size and number gear teeth or gear pitch to produce a certain forward and reverse torque ratio without departing from the scope of the present invention.

The present invention contemplates that a variety of torque ratios (i.e., the ratio of torque of the output member 14 to the input member 12) and ratio steps are achievable through the selection of tooth counts of the gears of the transmission 10. The present invention has many advantages and benefits over the prior art.

Figure 3:
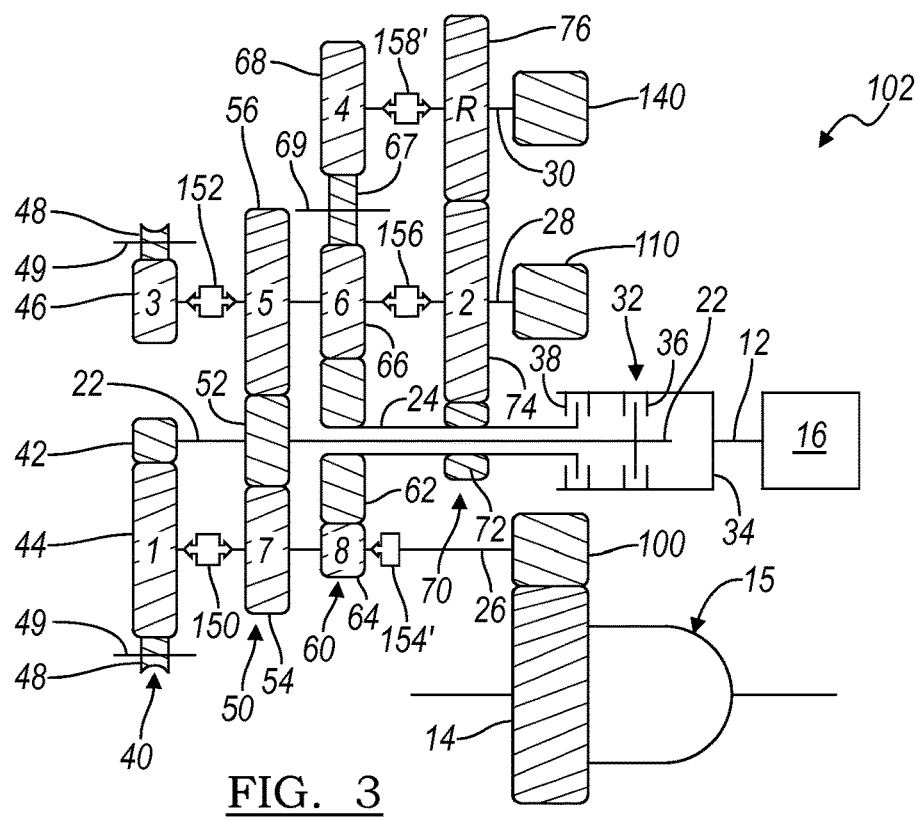
FIG. 3 is a schematic view of an embodiment of another eight speed transmission having a dual clutch, two transmission input shafts, three countershafts, a plurality of gear sets and a plurality of synchronizers, in accordance with the present invention.

With reference to FIG. 3., an alternate embodiment of an eight speed dual clutch transmission 102 is illustrated, in accordance with the present invention. The eight speed transmission 102 has the same components as transmission 10 as described above and as indicated by like reference numbers depicting like components, as shown in FIG. 1. However, transmission 102 has an alternate gear arrangement where the second gear 74 of the fourth gear set 70 has been eliminated and an additional set of gears have been added to the third gear set 60. More specifically, gear set 60 now includes an idler gear 67 and a fourth gear 68. Third gear 66 is in mesh with the idler gear 67. Idler gear 67 is in mesh with the fourth gear 68. Idler gear 67 is supported for free rotation on an idler shaft 69. The fourth gear 68 of gear set 60 is supported for free rotation on the third countershaft 30. Additionally, synchronizer 154 is now a single sided synchronizer 154' that selectively engages and disengages only the second gear 64 of third gear set 60 from the first countershaft 26. Further synchronizer 158 is now a double sided synchronizer 158'. Synchronizer 158' is configured to selectively and independently engage and disengage fourth gear 68 and gear 76 for common rotation with third countershaft 30. Gear ratios 1, 2, 3, 5, 7, 8 and reverse in transmission 102 are attained as described above with respect to transmission 10. However, alternatively the fourth forward torque ratio (i.e. a 4th gear) of transmission 102 is established by engaging clutch element 38 and synchronizer 158'. Clutch element 38 couples the input member 12 with the second transmission input shaft member 24. Synchronizer 158' connects for common rotation the third gear 76 of gear set 70 to third countershaft member 30. Synchronizer 158' is also configured to selectively connect for common rotation the fourth gear 68 of gear set 60 to third countershaft member 30. More specifically, input torque from the input shaft 12 is transferred through the dual clutch assembly 32 to the second transmission input shaft member 24 to gear 62, from gear 62 to gear 66, from gear 66 to idler gear 69, from gear 69 to gear 68, from gear 68 to synchronizer 158', from synchronizer 158' to third countershaft member 30, from third countershaft member 30 to third countershaft transfer gear 140 and from third countershaft transfer gear 140 to the output member 14.

Figure 4:
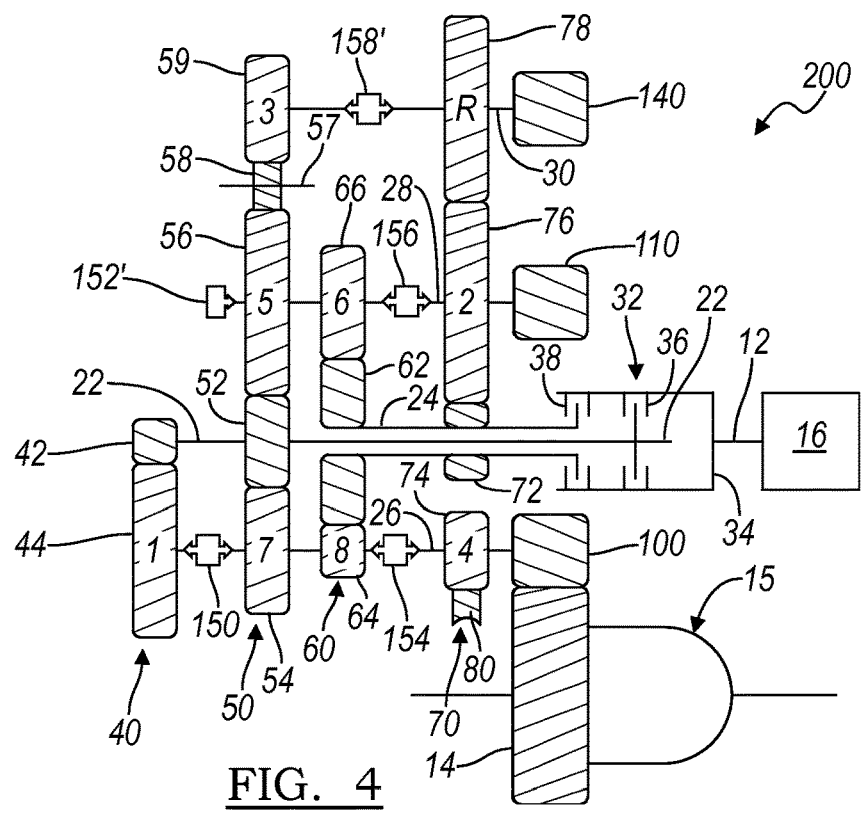
FIG. 4 is a schematic view of an embodiment of another eight speed transmission having a dual clutch, two transmission input shafts, three countershafts, a plurality of gear sets and a plurality of synchronizers, in accordance with the present invention.

Referring now to FIG. 4., an alternate eight speed dual clutch transmission 200 is illustrated according to the principles of the invention. Eight speed transmission 200 has the same components as described above with respect to transmission 10 of FIG. 1 and as indicated by like reference numbers depicting like components. The eight speed transmission 200 is achieved by removing the third gear 46 and the idler gear 48 from gear set 40 and adding an idler gear 58 and fourth gear 59 to gear set 50. More specifically, gear set 50 now includes an idler gear 58 and a fourth gear 59. Third gear 56 is in mesh with the idler gear 58. Idler gear 58 is in mesh with the fourth gear 59. Idler gear 58 is supported for free rotation on an idler shaft 57. The fourth gear 59 of gear set 50 is supported for free rotation on the third countershaft 30. Additionally, synchronizer 152 is now a single sided synchronizer 152' that selectively engages and disengages only the third gear 56 of second gear set 50 from the second countershaft 28. Further synchronizer 158 is now a double sided synchronizer 158'. Synchronizer 158' is configured to selectively and independently engage and disengage fourth gear 59 and gear 78 for common rotation with third countershaft 30. Gear ratios 1, 2, 4, 5, 7, 8 and reverse in transmission 200 are attained as described above with respect to transmission 10. However, alternatively the third forward torque ratio (i.e. a 3rd gear) of transmission 200 is established by engaging clutch element 36 and synchronizer 158'. Clutch element 36 couples the input member 12 with the first transmission input shaft member 22. Synchronizer 158' connects for common rotation the fourth gear 59 of gear set 50 to third countershaft member 30. Synchronizer 158' is also configured to selectively connect for common rotation the fourth gear 78 of gear set 70 to third countershaft member 30. More specifically, input torque from the input shaft 12 is transferred through the dual clutch assembly 32 to the first transmission input shaft member 22 to gear 52, from gear 52 to gear 56, from gear 56 to idler gear 58, from gear 58 to gear 59, from gear 59 to synchronizer 158', from synchronizer 158' to third countershaft member 30, from third countershaft member 30 to third countershaft transfer gear 140 and from third countershaft transfer gear 140 to the output member 14.

Figure 5:
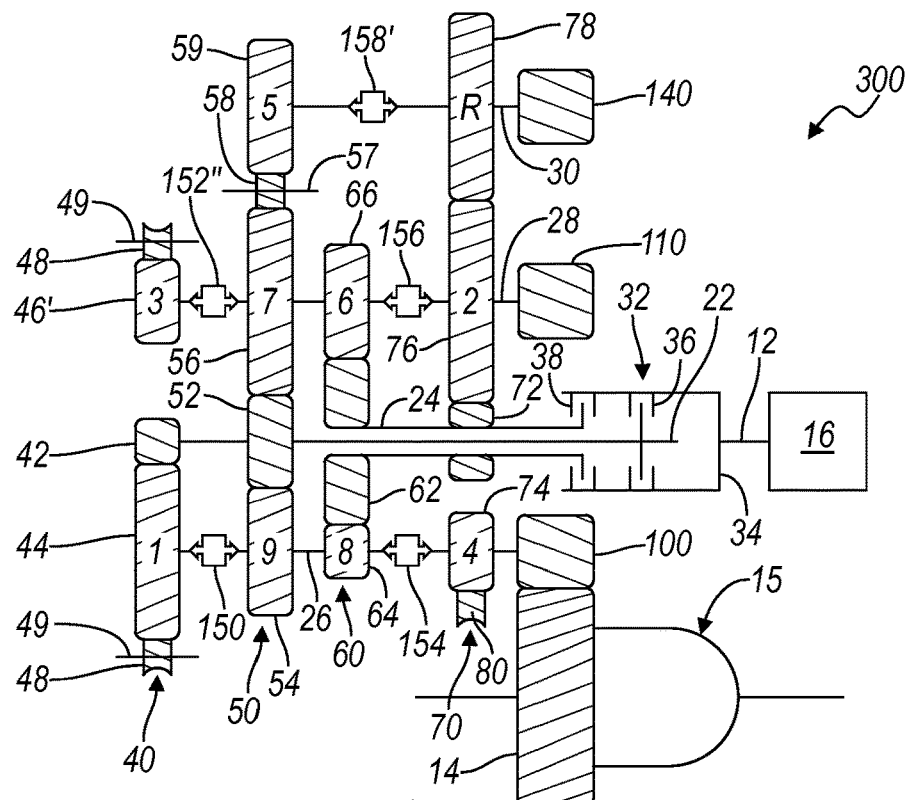
FIG. 5 is a schematic view of another embodiment of a nine speed transmission having a dual clutch, two transmission input shafts, three countershafts, a plurality of gear sets and a plurality of synchronizers, in accordance with the present invention.

Referring now to FIG. 5., an alternate arrangement for a nine speed dual clutch transmission 300 is illustrated according to the principles of the invention. Nine speed transmission 300 has the same components as described above with respect to transmission 200 of FIG. 4 and as indicated by like reference numbers depicting like components. However, transmission 300 has a different gear set arrangement for gear set 40. The nine speed transmission 300 is achieved by adding a third gear 46' and the idler gear 48' to gear set 40. Third gear 46' is in mesh with the idler gear 48'. Idler gear 48' is in mesh with the second gear 44. Idler gear 48' is supported for free rotation on an idler shaft 49. The fourth gear 46' of gear set 40 is supported for free rotation on the second countershaft 28. Additionally, synchronizer 152' is now a double sided synchronizer 152'' that selectively engages and disengages the third gear 46' of first gear set 40 and gear 78 from the second countershaft 28. Gear ratios 1, 2, 4, 6, 8 and reverse in transmission 300 are attained as described above with respect to transmission 200. However, alternatively the third forward torque ratio (i.e. a 3rd gear) of transmission 300 is established by engaging clutch element 36 and synchronizer 152''. Clutch element 36 couples the input member 12 with the first transmission input shaft member 22. Synchronizer 152'' connects for common rotation the third gear 46' of gear set 40 to second countershaft member 28. Synchronizer 152'' is also configured to selectively connect for common rotation the third gear 56 of gear set 50 to third countershaft member 28. More specifically, input torque from the input shaft 12 is transferred through the dual clutch assembly 32 to the first transmission input shaft member 22 to gear 42, from gear 42 to gear 44, from gear 44 to idler gear 48', from gear 48' to gear 46', from gear 46' to synchronizer 152'', from synchronizer 152'' to second countershaft member 28, from second countershaft member 28 to second countershaft transfer gear 110 and from third countershaft transfer gear 110 to the output member 14. However, alternatively the fifth forward torque ratio (i.e. a 5th gear) of transmission 300 is established by engaging clutch element 36 and synchronizer 158'. Clutch element 36 couples the input member 12 with the first transmission input shaft member 22. Synchronizer 158' connects for common rotation the fourth gear 59 of gear set 50 to third countershaft member 30. More specifically, input torque from the input shaft 12 is transferred through the dual clutch assembly 32 to the first transmission input shaft member 22 to gear 52, from gear 52 to gear 56, from gear 56 to idler gear 58, from gear 58 to gear 59, from gear 59 to synchronizer 158', from synchronizer 158' to third countershaft member 30, from third countershaft member 30 to third countershaft transfer gear 140 and from third countershaft transfer gear 140 to the output member 14. To establish a seventh forward torque ratio (i.e. a 7th gear), clutch element 36 is engaged and synchronizer 152'' is activated. Clutch element 36 couples the input member 12 with the first transmission input shaft member 22. Synchronizer 152'' connects the third pinion 56 of the second gear set 50 to the second countershaft member 28. More specifically, input torque from the input shaft 12 is transferred through the dual clutch assembly 32 to the first transmission input shaft member 22 and to gear 52, from gear 52 to gear 56, from gear 56 to synchronizer 152'', from synchronizer 152'' to the second countershaft member 28, from second countershaft member 28 to the second countershaft transfer gear 110 and from second countershaft transfer gear 110 to the output member 14. To establish a ninth forward torque ratio (i.e. a 9th gear), clutch element 36 is engaged and synchronizer 150 is activated. Clutch element 36 couples the input member 12 with the first transmission input shaft member 22. Synchronizer 150 connects second pinion gear 54 of the second gear set 50 the first countershaft member 26. More specifically, input torque from the input shaft 12 is transferred through the dual clutch assembly 32 to the first transmission input shaft member 22 and to gear 52, from gear 52 to gear 54, from gear 54 to synchronizer 150, from synchronizer 150 to first countershaft member 26, from first countershaft member 26 to first countershaft transfer gear 100, from first countershaft transfer gear 100 to the output member 14.

Figure 6:
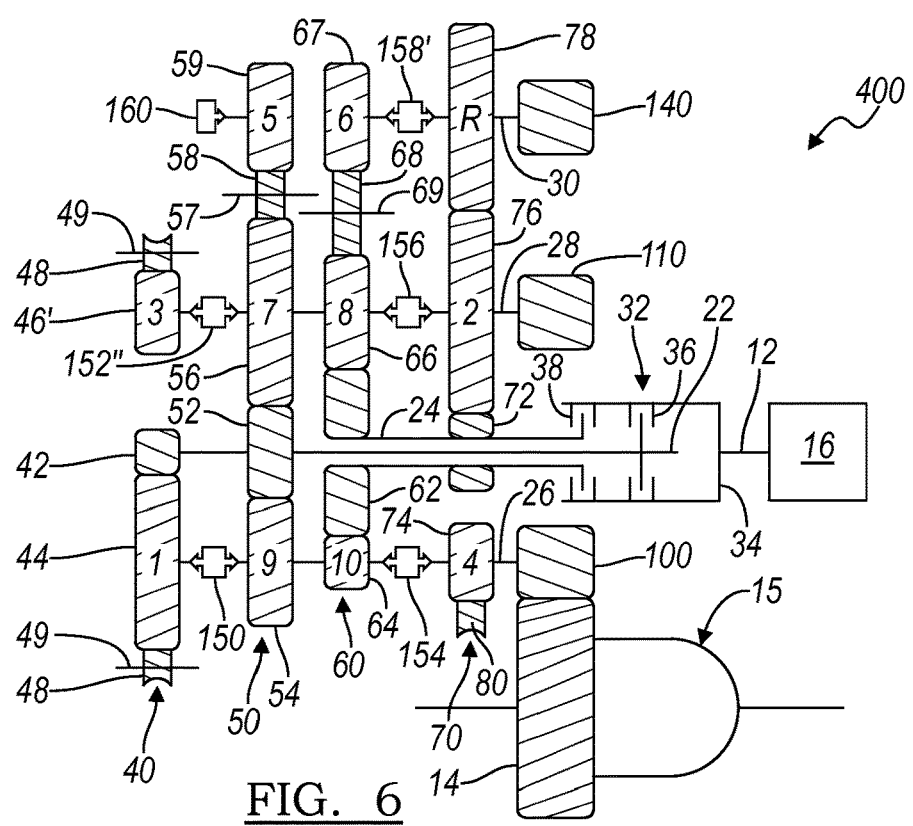
FIG. 6 is a schematic view of another embodiment of a ten speed transmission having a dual clutch, two transmission input shafts, three countershafts, a plurality of gear sets and a plurality of synchronizers, in accordance with the present invention.

Referring now to FIG. 6., an alternate arrangement for a ten speed dual clutch transmission 400 is illustrated according to the principles of the invention. Ten speed transmission 400 has the same components as described above with respect to transmission 300 of FIG. 5 and as indicated by like reference numbers depicting like components. However, transmission 400 has a different gear set arrangement for gear set 60. The ten speed transmission 400 is achieved by adding a fourth gear 67 and an idler gear 68 to gear set 60. Fourth gear 67 is in mesh with the idler gear 68. Idler gear 68 is also in mesh with the third gear 66. Idler gear 68 is supported for free rotation on an idler shaft 69. The fourth gear 67 of gear set 60 is supported for free rotation on the third countershaft 30. Additionally, synchronizer 158' now selectively engages and disengages the fourth gear 67 of third gear set 60 and gear 78 from the third countershaft 30. Further, a synchronizer 160 is added to ten speed transmission 400 to selectively engage and disengage the fourth gear 59 of second gear set 50 from the third countershaft 30. Gear ratios 1, 2, 3, 4, 7, 9 and reverse in transmission 400 are attained as described above with respect to transmission 300. However, alternatively the fifth forward torque ratio (i.e. a 5th gear) of transmission 400 is established by engaging clutch element 36 and synchronizer 160. Clutch element 36 couples the input member 12 with the first transmission input shaft member 22. Synchronizer 160 connects for common rotation the fourth gear 59 of gear set 50 to third countershaft member 30. More specifically, input torque from the input shaft 12 is transferred through the dual clutch assembly 32 to the first transmission input shaft member 22 to gear 52, from gear 52 to gear 56, from gear 56 to idler gear 58, from idler gear 58 to gear 59, from gear 59 to synchronizer 160, from synchronizer 160 to third countershaft member 30, from third countershaft member 30 to third countershaft transfer gear 140 and from third countershaft transfer gear 140 to the output member 14. However, alternatively the sixth forward torque ratio (i.e. a 6th gear) of transmission 400 is established by engaging clutch element 38 and synchronizer 158'. Clutch element 38 couples the input member 12 with the second transmission input shaft member 24. Synchronizer 158' connects for common rotation the fourth gear 67 of gear set 60 to third countershaft member 30. More specifically, input torque from the input shaft 12 is transferred through the dual clutch assembly 32 to the second transmission input shaft member 24 to gear 62, from gear 62 to gear 66, from gear 66 to idler gear 68, from gear 68 to gear 67, from gear 67 to synchronizer 158', from synchronizer 158' to third countershaft member 30, from third countershaft member 30 to third countershaft transfer gear 140 and from third countershaft transfer gear 140 to the output member 14. To establish an eighth forward torque ratio (i.e. an 8th gear), clutch element 38 is engaged and synchronizer 156 is activated. Clutch element 38 couples the input member 12 with the second transmission input shaft member 24. Synchronizer 156 connects the third pinion 66 of the third gear set 60 to the second countershaft member 28. More specifically, input torque from the input shaft 12 is transferred through the dual clutch assembly 32 to the second transmission input shaft member 24 and to gear 62, from gear 62 to gear 66, from gear 66 to synchronizer 156, from synchronizer 156 to the second countershaft member 28, from second countershaft member 28 to the second countershaft transfer gear 110 and from second countershaft transfer gear 110 to the output member 14. To establish a tenth forward torque ratio (i.e. a 10th gear), clutch element 38 is engaged and synchronizer 154 is activated. Clutch element 38 couples the input member 12 with the second transmission input shaft member 24. Synchronizer 154 connects second pinion gear 64 of the third gear set 60 the first countershaft member 26. More specifically, input torque from the input shaft 12 is transferred through the dual clutch assembly 32 to the second transmission input shaft member 24 and to gear 62, from gear 62 to gear 64, from gear 64 to synchronizer 154, from synchronizer 154 to first countershaft member 26, from first countershaft member 26 to first countershaft transfer gear 100, from first countershaft transfer gear 100 to the output member 14.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
    a transmission housing;
    a dual clutch assembly having a first clutch, a second clutch and a clutch housing connectable to an engine output member, wherein the clutch housing is rotationally supported within the transmission housing;
    a first, second, third and fourth gear set, wherein the first gear set includes a first gear, a second gear, a third gear and an idler gear, wherein the first gear is in mesh with the second gear and the second gear is in mesh with the idler gear and the idler gear is in mesh with the third gear, the second gear set includes a first gear in mesh with a second gear and a third gear, the third gear set includes a first gear in mesh with a second gear and a third gear, the fourth gear set includes a first gear, a second gear, a third gear, a fourth gear and an idler gear, wherein the first gear is in mesh with the third gear, the third gear is in mesh with fourth gear and the idler gear and the second gear is in mesh with the idler gear;
    a first transmission input member rotatably supported in the transmission housing and wherein the first gear of the first gear set and the first gear of the second gear set are rotatably fixed for common rotation with the first transmission input member and wherein the selective engagement of the first clutch of the dual clutch assembly transfers torque from the clutch housing to the first transmission input member;
    a second transmission input member rotatably supported in the transmission housing and wherein the first gear of the third gear set and the first gear of the fourth gear set are rotatably fixed for common rotation with the second transmission input member and wherein the second transmission input member is concentric with the first transmission input member and at least partially overlays the first transmission input member and wherein the selective engagement of the second clutch of the dual clutch assembly transfers torque from the clutch housing to the second transmission input member;
    a first countershaft rotatably supported within the transmission housing and spaced apart from and parallel with the first and second transmission input members, wherein the second gear of the first gear set, the second gear of the second gear set, the second gear of the third gear set, the second gear of the fourth gear set are selectively connectable for common rotation with the first countershaft;
    a second countershaft rotatably supported within the transmission housing and spaced apart from and parallel with the first and second transmission input members, wherein the third gear of the first gear set, the third gear of the second gear set, the third gear of the third gear set, the third gear of the fourth gear set are each selectively connectable for common rotation with the second countershaft;
    a third countershaft rotatably supported within the transmission housing and spaced apart from and parallel with the first and second transmission input members, wherein the fourth gear of the fourth gear set is selectively connectable for common rotation with the third countershaft;
    a first countershaft transfer gear rotatable fixed to the first countershaft for common rotation with the first countershaft;
    a second countershaft transfer gear rotatable fixed to the second countershaft for common rotation with the second countershaft;
    a third countershaft transfer gear rotatable fixed to the third countershaft for common rotation with the third countershaft wherein the first, second and third countershaft transfer gears transfer torque to a transmission output member;
    five synchronizer assemblies for selectively coupling at least one of gears of the four gear sets with at least one of the first, second and third countershafts, and
    wherein the selective engagement of the first and second clutches of the dual clutch assembly interconnects the dual clutch housing with at least one of the first and the second transmission input members and the selective engagement of at least one of the five synchronizer assemblies establishes at least one of a plurality of forward and reverse speed ratios.

2. The transmission of claim 1 wherein a first of the five synchronizer assemblies selectively connects the second gear of the first gear set and the second gear of the second gear set to the first countershaft.

3. The transmission of claim 2 wherein a second of the five synchronizer assemblies selectively connects the third gear of the first gear set and the third gear of the second gear set to the second countershaft.

4. The transmission of claim 3 wherein a third of the five synchronizer assemblies selectively connects the second gear of the third gear set and the second gear of the fourth gear set to the first countershaft.

5. The transmission of claim 4 wherein a fourth of the five synchronizer assemblies selectively connects the third gear of the third gear set and the third gear of the fourth gear set to the second countershaft.

6. The transmission of claim 5 wherein a fifth of the five synchronizer assemblies selectively connects the fourth gear of the fourth gear set to the third countershaft.

7. The transmission of claim 1 wherein the second gear set further comprises a fourth gear and an idler gear, wherein the fourth gear is in mesh with the idler gear and the idler gear is in mesh with the third gear of the fourth gear set.

8. The transmission of claim 7 wherein a fifth of the five synchronizer assemblies selectively connects the fourth gear of the second gear set and the fourth gear of the fourth gear set to the third countershaft.

9. The transmission of claim 1 wherein the third gear set further comprises a fourth gear and an idler gear, wherein the fourth gear is in mesh with the idler gear and the idler gear is in mesh with the third gear of the fourth gear set.

10. The transmission of claim 9 further comprising a sixth synchronizer assembly for selectively connecting the fourth gear of the second gear set to the third countershaft.

11. The transmission of claim 1 wherein the transmission output member is a gear that meshes with the each of the first, second and third countershaft transfer gears.

12. The transmission of claim 1 wherein the fourth gear set is adjacent the dual clutch assembly, the third gear set is adjacent the fourth gear set, the second gear set is adjacent the third gear set and the first gear set is disposed between the second gear set and an end wall of the transmission housing.

13. The transmission of claim 1 wherein the selective engagement of the first and second clutches of the dual clutch assembly interconnects the dual clutch housing with at least one of the first and the second transmission input members and the selective engagement of at least one of the five synchronizer assemblies establishes eight forward speed ratios and one reverse speed ratios.

14. The transmission of claim 1 wherein the first gear set provides a first gear ratio and a third gear ratio.

15. The transmission of claim 1 wherein the second gear set provides a fifth gear ratio and a seventh gear ratio.

16. The transmission of claim 1 wherein the third gear set provides a sixth gear ratio and an eighth gear ratio.

17. The transmission of claim 1 wherein the fourth gear set provides a second gear ratio, a fourth gear ratio, and a reverse gear ratio.

* * * * *